United States Patent Office 3,523,111
Patented Aug. 4, 1970

3,523,111
EMULSION POLYMERIZATION OF VINYL CHLO-
RIDE WITH REDOX INITIATOR SYSTEM COM-
PONENTS AND EMULSIFIER PREPARED BE-
FORE MONOMER ADDITION
Alexander A. Bibeau and Orlando L. Marcheschi, Wil-
braham, and Yorke P. Phillips, Hampden, Mass., as-
signors to Monsanto Company, St. Louis, Mo., a cor-
poration of Delaware
No Drawing. Filed Aug. 18, 1967, Ser. No. 661,554
Int. Cl. C08f 1/13, 1/62, 3/30
U.S. Cl. 260—92.8                                    12 Claims

ABSTRACT OF THE DISCLOSURE

There is disclosed a method for polymerizing vinyl chloride monomers which is highly reproducible from run to run, and which yields relatively small polymer particles of relatively predetermined size distribution. In the method, a polymerization medium is first prepared by admixing in water an emulsifying agent and compo- nents providing a redox catalyst system comprising sul- fate and sulfite radicals and an activating metal ion. After permitting interaction of the reactive components of the polymerization medium to occur for a period of time, vinyl chloride monomer is introduced and dis- persed. The resulting dispersion is then subjected to polymerization conditions for a period of time sufficient to polymerize at least a major portion of the vinyl chloride monomer present, after which vinyl chloride polymer is recovered from the polymerization medium.

BACKGROUND OF THE INVENTION

For many purposes, it is highly desirable to produce small particles of vinyl chloride polymer of relatively predetermined, narrow size distribution, and such particles have been attained by prior art polymerization techniques although without a high degree of reproducibility. It is ap- parent, however, that if a technique is to provide maxi- mum benefit for purposes where size is important, the results thereof should be reproducible from run to run.

Accordingly, it is an object of the present invention to provide an aqueous emulsion polymerization process by which vinyl chloride polymers of relatively small particle size and a predetermined narrow size distribution can be produced, which process is highly reproducible from run to run.

It is also an object to attain such reproducibility in an aqueous emulsion polymerization process by a simple and convenient technique enabling use of conventional equipment.

SUMMARY OF THE INVENTION

It has now been found that the foregoing and related objects can be readily attained in a polymerization process wherein a polymerization medium is first prepared by ad- mixing water, an emulsifying agent and components pro- viding a redox catalyst system comprising radicals of sulfate and sulfite and an activating ion. The reactive materials in the polymerization medium are then al- lowed to interact during an induction period ranging between 10 minutes and three hours after which vinyl chloride monomer formulation is introduced and dis- persed in said medium. The resulting dispersion is sub- jected to polymerization conditions for a period of time sufficient to polymerize at least a major portion of the vinyl chloride monomer formulation, and vinyl chloride polymer is subsequently recovered from the polymeriza- tion medium.

Although the theory of the present invention is not fully understood, it is believed that the effectiveness of the technique is derived from the control of oligomeric soap which is formed during the early stages of polymerization. In the polymerization of vinyl chloride and similar monomers in a redox system, it is thought that vinyl chloride oligomeric chains are formed which react with sulfite and/or sulfate radicals to form a soap. Since this soap may function as an emulsifying agent, it can profoundly influence the size of particles which are ultimately obtained from the polymerization process. Therefore, since the amount of oligomeric soap which is formed in situ is not known or is not predictable under the conditions conventionally utilized wherein monomer and catalyst system are added to the emulsion medium at about the same time, the amount of soap may vary from run to run resulting in non-reproducibility of the aver- age particle sizes and narrow size distribution.

It is believed that the period of interaction which is provided prior to the introduction of any monomer results, for one reason or another, in a consistent level of reactivity of the catalyst system. In the present process, some of the metal ions may react with the emulsifying agent or with the catalyst during the induction period to provide a stable level of catalyst components. Whatever the mode of operation, the induction period provided in the present invention results in control of the amount of oligomeric soap which is formed, thus making the process reproducible by control of the induction period.

The polymerization medium in which the monomer formulation is dispersed comprises water, emulsifier and the compounds which make up the redox catalyst system. Normally, a buffering agent will also be included in the polymerization medium in order to stabilize the pH of the system. The amount of water which is utilized can vary greatly so long as there is a sufficient amount to constitute an aqueous phase for the polymerization re- action. Generally, about 60 to 200 parts of water per 100 parts of polymerizable monomer will be utilized (a ratio of about 0.6–2.0:1.0), and preferably about 130 and 170 parts per hundred of monomer (a ratio of about 1.3–1.7:1.0).

Any of the emulsifying agents which are commonly used for this type of emulsion polymerization reaction can be incorporated initially into the polymerization medium. The ammonium and alkali metal sulfates of long chain saturated aliphatic compounds containing from ten to twenty carbon atoms have been particularly advantage- ous in the process, such as the ammonium, sodium and potassium salts of decyl, lauryl, palmityl, stearyl, do- decanoyl, etc. sulfates.

The total amount of emulsifying agent which is utilized depends, of course, upon the total amount of monomer which is to be emulsified as well as the desired particle size. Generally, the total amount of emulsifier employed will be about 0.15 to 0.50 percent, and preferably about 0.20 to 0.25 percent, based upon the weight of monomer formulation. In the initial charge for the polymerization medium, only a fraction of the total amount of emulsify- ing agent is generally used. The amount of emulsifying agent admixed initially with the water generally is about 0.001 to 0.025 percent, and preferably 0.003 to 0.015 percent, based upon the weight of monomer to be in- troduced, with the remaining emulsifying agent being added with the vinyl chloride monomer formulation.

In the polymerization reaction, the pH of the emulsion should normally be controlled within the range of about 4.0 to 8.0 by the incorporation of a buffering agent since it is found that the best rates of reaction are usually at- tained when the pH value is maintained within this range. Although any suitable buffering agent may be used, sodi- um bicarbonate has been found to be highly beneficial, at least in part because its decomposition products are in- nocuous to the resultant polymer. However, other buffers which are relatively inert to the vinyl chloride polymer may also be used such as sodium carbonate, ammonium hydroxide, etc. The buffer is incorporated into the polymerization medium at the time that it is prepared.

In forming the redox catalyst system, any compounds which will provide the necessary radicals can be used, and such compounds are well known to those who are skilled in the art. Exemplary sources of the sulfate and sulfite radicals are persulfate-bisulfite and bisulfite-peroxide mixtures. It will be appreciated that each radical may be provided separately by suitable water-soluble sulfate or sulfite compounds, or that, alternatively, a radical may be formed in situ from a sulfur compound, such as when bisulfite-peroxied mixtures are used.

Any of the water-soluble peroxides and persalts may be used to furnish the sulfate radical, the ammonium, sodium and potassium persulfates being particularly preferred. The sulfite radical may be provided by sodium bisulfite, sodium formaldehyde sulfoxylate, sulfur dioxide, sodium thiosulfite or an organic oxidizable sulfoxy compound such as diethyl sulfite, etc. These compounds should be used in amounts which will yield the desired radicals in the required amounts.

The quantity of sulfate radical which will be included in the polymerization system should be about 0.003 to 0.4 percent, based upon the weight of polymerizable monomer, and preferably about 0.007 to 0.02 percent. The amount of sulfite radical-bearing component should be chosen so as to yield a percentage of sulfite radical from about 0.007 to 0.8 percent and preferably about 0.05 to 0.2 percent, on the same basis. Thus, when the sulfate-providing component is potassium persulfate the amount used will preferably be about 0.01 to 0.03 percent, and when sodium bisulfite provides the sulfite radical it will be used preferably in an amount of about 0.07 to 0.25 percent. The ratio of sulfite to sulfate radicals should be about 1.0–15.0:1.0 and preferably about 3.0 and 10.0:1.0.

For the redox catalyst system to function properly, it is also necessary that a trace amount of activating metal ions be present. This metal may be any which is well known to the art, such as iron, copper, chromium, etc. Often, it is not necessary to add the metal ion as a separate component since sufficient amounts are usually present as trace-impurities in the water which may be used for the polymerization medium. Of course, if for some reason it is desirable to use highly purified or deionized water, it may be found necessary to introduce the activating metal ion separately.

After all of the foregoing ingredients have been admixed and such other materials introduced as may be desirable, the resulting medium is heated with agitation, usually under a vacuum, to a temperature within the range 40° to 60° centigrade, and more desirably within the range 50° to 58° centigrade. The period of interaction may vary over a wide range but must be at least about 10 minutes. A period of three hours represents a practical upper limit. Normally, an induction period of less than one hour is sufficient, and the preferred period is from 15 to 45 minutes. It is to be noted that the criterion upon which the induction or reaction is based is only that it provides a catalyst system having a reactivity which is so stabilized that it can be reproduced from run to run by providing a like induction period.

At the completion of the induction period, the polymerizable monomer formulation is introduced into the medium and dispersed. The monomer charge may be added all at once or, alternatively, the monomer may be introduced incrementally or continuously. In the preferred method, a fairly large charge is added initially, and the remaining monomer is added incrementally thereafter. Conditions in the reaction vessel are adjusted, if necessary, to provide a suitable environment for the polymerization of monomer to occur. A temperature of about 30° to 65° centigrade and autogenous pressures are maintained. Accordingly, the pressure within the reaction vessel will be about 50 to 150 p.s.i.g. The preferred polymerization temperature range is about 50° to 60° centigrade.

The reaction is continued until about 60.0 to 98.0 percent of the monomer formulation present has been converted to polymer, and preferably until 88.0 to 94.0 percent conversion. This will require a polymerization period of about two to fourteen hours and preferably about three to ten hours. After the desired degree of conversion has been attained, the particles of polymer are separated from the reaction medium by conventional techniques, washed and dried.

By utilizing the foregoing procedure, it is found that vinyl chloride polymers having a relatively narrow distribution of particle sizes are obtained, the average diameter thereof generally being about 0.2 to 0.6 micron and, under the preferred conditions, about 0.35 to 0.45 micron. The standard deviation from run to run which is obtainable with this method will generally be on the order of 0.01 micron or less. This is indicative of the high order of reproducibility of polymer particle size which is obtainable utilizing the technique of the invention.

Although throughout the specification the invention has been described in terms of vinyl chloride, it is also applicable to copolymers thereof in which the vinyl chloride constitutes at least 50.0 percent by weight of the copolymer, and preferably at least 80.0 percent. Among the materials which may be copolymerized with vinyl chloride in the process of this invention are vinyl esters such as vinyl acetate, vinyl butyrate, vinyl stearate, vinyl benzoate; acrylic and alpha-substituted acrylic esters, nitriles and amides such as methyl acrylate, ethyl methacrylate, butyl phenacrylate, acrylonitrile, methacrylonitrile, methacrylamide, etc.; esters of alpha, beta-ethylenically unsaturated dicarboxylic acids such as the dialkyl esters of maleic, fumaric, citraconic, itaconic, etc., acids including diethyl maleate, diethyl fumarate, dibutyl itaconate, etc.; vinylidene halides such as vinylidene chloride, etc.

DESCRIPTION OF THE PREFERRED EMBODIMENTS

Illustrative of the efficacy of the present invention are the following specific examples, wherein all parts and percentages are by weight unless otherwise specified.

Example 1

Over a period of about twenty minutes, 150 parts by weight of water at a temperature of 54° centigrade, 0.2 part of potassium persulfate, 0.125 part of sodium bisulfite, 0.005 part of sodium lauryl sulfate emulsifier and 0.08 part of sodium bicarbonate are admixed in a reaction vessel under agitation. After this addition is complete, a vacuum is drawn upon the vessel and the materials in the polymerization medium are allowed to interact over a period of about fifty minutes.

One hundred parts of vinyl chloride monomer and an additional quantity of sodium lauryl sulfate sufficient to bring the total amount of emulsifier to 0.23 part are introduced, and the reaction is allowed to proceed at about 50° centigrade and autogenous pressure for about five hours. At the completion of the reaction period, the vinyl chloride polymer is recovered, washed and dried. The average particle sizes in batches of polymer prepared using the foregoing technique are respectively 0.447, 0.454, 0.459 and 0.437 micron in diameter, representing a standard deviation of 0.010 micron.

Example 2

A procedure similar to that utilized in Example 1 is repeated except that the sodium bisulfite is not introduced initially, but only after the vacuum is drawn, and no induction period is allowed prior to addition of vinyl chloride monomer. Seven different batches are prepared in this manner and the average size of the particles are found respectively to be 0.403, 0.380, 0.470, 0.450, 0.441, 0.472, 0.442 micron in diameter. This represents a standard deviation of 0.034 micron, which is a relatively poor level of reproducibility not acceptable for many purposes where controlled particle size and narrow predetermined distributions are required.

Example 3

The procedure of Example 1 is substantially repeated with the sole modification that in place of vinyl chloride monomer used therein a mixture of 75.0 percent vinyl chloride monomer and 25.0 percent vinyl acetate monomer is utilized. In a number of runs, it is found that the reproducibility of average particle sizes of the products is excellent, and that the particles are both small and confined to a relatively narrow range of distribution.

Thus, is can be seen that the present invention provides a method for polymerizing vinyl chloride monomers which is highly reproducible from run to run and produces small particles of polymer having a predeterminable, relatively narrow size distribution. The process is simply and readily effected and may utilize existing reactors which are presently employed to prepare vinyl chloride polymers in an aqueous emulsion.

Having thus described the invention, we claim:

1. In a reproducible polymerization process for producing small particles of vinyl chloride polymer of relatively narrow size distribution, the steps comprising: (1) forming a polymerization medium by admixing water, an emulsifying agent and compounds providing a redox catalyst system comprising radicals of sulfate and sulfite and an activating metal ion, (2) allowing interaction of the materials in the polymerization medium to occur for a period of time ranging between ten minutes and three hours, (3) thereafter introducing and dispersing vinyl chloride monomer formulation in said medium, (4) subjecting the resulting dispersion to polymerization conditions for a period of time sufficient to polymerize at least a major portion of said vinyl chloride monomer formulation, and (5) recovering vinyl chloride polymer from said medium.

2. The process of claim 1 wherein said water is utilized in an amount sufficient to yield a ratio of water to polymerizable monomer of about 0.6–2.0:1.0; wherein said emulsifying agent is admixed in said polymerization medium in an amount of 0.001 to 0.025 percent, based upon the weight of said monomer; and wherein said compounds providing said redox catalyst system are admixed in amounts sufficient to provide about 0.003 to 0.35 percent of sulfate radical and about 0.007 to 0.8 percent of sulfite radical, both based upon the weight of said monomer.

3. The process of claim 1 wherein said interaction occurs under vacuum and at a temperature of about 40 to 60° centigrade.

4. The process of claim 1 wherein said sulfate radical is provided by a salt selected from the group consisting of ammonium and alkali metal persulfates and said sulfite radical is provided by an alkali metal bisulfite, said metal ion being provided as a trace impurity in said water.

5. The process of claim 1 wherein about 0.03 to 1.0 percent of an alkali metal bicarbonate, base upon the weight of said monomer, is admixed in said polymerization medium.

6. The process of claim 1 wherein the amount of said emulsifying agent added prior to termination of polymerization is about 0.15 and 0.50 percent, based upon the weight of said monomer formulation.

7. The process of claim 6 wherein the major portion of said emulsifying agent is introduced with said monomer formulation.

8. The process of claim 1 wherein said monomer formulation includes at least one material copolymerizable with said vinyl chloride monomer in an amount of less than 50 percent by weight of said monomer formulation.

9. The process of claim 1 wherein said polymerization conditions comprise autogenous pressure and temperatures ranging between about 30° and 65° centigrade and said polymerization reaction is continued for a period of time sufficient to polymerize from about 60 to 98 percent of said vinyl chloride monomer formulation.

10. In a reproducible polymerization process for producing small particles of vinyl chloride polymer of relatively narrow size distribution, the steps comprising: (1) forming a polymerization medium by admixing about 130 to 170 parts of water, about 0.003 to 0.015 part of an emulsifying agent selected from the group consisting of ammonium and alkali metal salts of organic compounds containing from 10 to 20 carbon atoms, about 0.01 to 0.03 part of a salt selected from the group consisting of ammonium and alkali metal persulfates, about 0.07 to 0.25 part of an alkali metal bisulfite and about 0.05 to 0.10 part of alkali metal bicarbonate; (2) allowing interaction of the materials in the polymerization medium to occur for a period of time of about ten minutes to three hours; (3) thereafter introducing and dispersing 50 to 150 parts of vinyl chloride monomer formulation in said medium; (4) subjecting the resulting dispersion to polymerization conditions for a period of time sufficient to polymerize at least a major portion of said vinyl chloride monomer formulation; and (5) recovering vinyl chloride polymer from said medium.

11. The process of claim 10 wherein said interaction occurs under vacuum and at a temperature of about 50 to 60° centigrade.

12. The process of claim 10 wherein said vinyl chloride monomer formulation consists of vinyl chloride monomer.

References Cited

UNITED STATES PATENTS

| | | | |
|---|---|---|---|
| 2,581,402 | 1/1952 | Fryling | 260—92.8 |
| 2,904,409 | 9/1959 | Bolstad | 260—84.1 |

JOSEPH L. SCHOFER, Primary Examiner

J. A. DONAHUE, Jr., Assistant Examiner

U.S. Cl. X.R.

260—85.5, 86.3, 87.1, 87.5, 87.7